United States Patent Office 2,784,175
Patented Mar. 5, 1957

2,784,175
VINYL ETHER AND POLYMER THEREOF

Donald K. Keel, Cranford, and Charles H. Mayhew, Mountain View, N. J., assignors to International Telephone and Telegraph Corporation, a corporation of Maryland No Drawing. Application July 2, 1953,
Serial No. 365,770

8 Claims. (Cl. 260—91.1)

This invention relates to new synthetic resinous materials. More particularly it relates to a new halocarbon ether and polymerization products obtained therefrom.

Various halocarbons such as tetrafluorethylene and chlorotrifluorethylene have been successfully polymerized to yield high polymers showing good chemical inertness and resistance to decomposition at elevated temperatures. These fluorine-containing polymers, although of considerable usefulness, nevertheless have certain drawbacks with respect to their chemical and physical properties. Thus polytetrafluoroethylene is difficult to apply as an insulating material for cables without resorting to pressure extrusions using powders or lubricated pastes, or the use of elaborate dip-coating techniques. Also, coatings obtained using these materials show undesirable porosity and poor insulation resistance in water immersion tests unless specially treated.

It is an object of the present invention to prepare a novel halocarbon compound polymerizable to useful resinous compositions of matter. It is a further object to describe a method suitable for the polymerization of this new halocarbon compound. It is a further object to produce a material showing a flexibility suitable for use as a high temperature wire insulant. It is a further object to produce a material capable of forming polymers usable at temperatures above 200° C. and preferably above 250° C.

These and other objects of this invention may be attained by preparing the new compound 1-fluoro-2,2-dichlorovinyl methyl ether ($CH_3OCF=CCl_2$) and then polymerizing it. Preferably, this compound may be prepared by the reacting together of methanol and dichlorodifluoroethylene using sodium as a catalyst to give the saturated ether 1,1-difluoro-2,2-dichloroethyl methyl ether ($CH_3OCF_2CHCl_2$). This ether is then treated with molten alkali, and the compound 1-fluoro-2,2-dichlorovinyl methyl ether is formed by the removal of hydrogen fluoride from the saturated ether.

As a specific example of the preparation of 1-fluoro-2,2-dichlorovinyl methyl ether, the following method was used.

Example I

Into a three-necked 5-liter flask was placed 150 grams of sodium hydroxide pellets, 97% assay. These were heated to the molten state. Nitrogen was then added to this flask through a flowmeter at a rate sufficient to provide an inert atmosphere and at the same time to cause turbulence in the liquid. Purified 1,1-difluoro-2,2-dichloroethyl methyl ether in the amount of 38.0 grams (0.23 moles) was added from a dropping funnel to the molten caustic mass at temperatures ranging from 338° to 365° C. This purified 1,1-difluoro-2,2-dichloroethyl methyl ether had previously been obtained by the reacting together of methyl alcohol and dichlorodifluoroethylene ($CCl_2:CF_2$) in the presence of sodium as a catalyst, as previously mentioned. The boiling point of this saturated ether was 51° C. at a pressure of 100 millimeters of mercury. Its refractive index $n_D^{25}$ was 1.3839. At the end of approximately two hours when all of the saturated ether had been added, 22.6 grams of an organic condensate was obtained in the receiving vessel, as well as 2 to 3 milliliters of water and 4.6 grams of a condensate which collected in a cold trap following the receiving vessel. The recovery of this crude organic product was 84.83% based on a theoretical yield of 33.38 grams of pure 1-fluoro-2,2-dichlorovinyl methyl ether. After rectification of this liquid, a water-white mobile liquid with an ethereal odor, when freshly distilled under nitrogen, was obtained. This liquid had a boiling point of 101 to 102.5° C. at a pressure of 760 millimeters of mercury, a refractive index $n_D^{25.5}$ of 1.4036 and a density (25.4°/25.4°) of 1.3892. The molecular weight of this compound calculated from the observed density and refractive index by use of the Lorentz-Lorenz equation was 142.85 compared to the formula weight of 144.97. It was found that this product showed a considerable tendency to hydrolyze in moist air forming phosgene. It also adds bromine readily and decolorizes neutral potassium permanganate solution. It was found that by additional fractionation of the unsaturated ether a product of still higher purity was obtained having the same density as the starting material (1.3892), a boiling point of 54 to 54.5° C. at a pressure of 150–151 millimeters mercury, and a refractive index $n_D^{20}$ of 1.4260. The addition of 1% quinoline to the 1-fluoro-2,2-dichlorovinyl methyl ether appeared to stabilize it for several days at room temperature. The uninhibited purified product was generally stored at the temperature of solid carbon dioxide prior to polymerization.

Example II

As an alternative method of preparing 1-fluoro-2,2-dichlorovinyl methyl ether, a 1:1 mixture (by weight) of potassium hydroxide and sodium hydroxide was employed in place of the sodium hydroxide mentioned in Example I. The temperature of reaction using this caustic mixture was maintained between 217° C. and 262° C. The remaining procedure that was followed and the results that were obtained were as in Example I.

Varying the proportions or nature of the caustic mixture used will vary the eutectic temperature of the mixture and hence the temperature at which the reaction will be maintained. In general, a temperature above 200° C. and not in excess of 400° C. is satisfactory for preparing the vinyl monomer.

Considerable difficulty occurred in attempts to polymerize this unsaturated ether using standard polymerization techniques. It was found, however, that the use of boron trifluoride dissolved in an inert, hydrocarbon-type solvent, liquid at temperatures substantially below room temperature, resulted in a successful polymerization of the vinyl monomer. Liquid butane and liquid propane were particularly preferable as solvents.

An example of this polymerization is shown as follows:

Example III

The vinyl ether (1-fluoro-2,2-dichlorovinyl methyl ether), 6.5 grams, was mixed with 15 milliliters of liquid propane which was cooled to −60° C. in a test tube. In a second test tube was condensed 5 milliliters of liquid propane. Boron trifluoride gas was passed into the liquid propane in the second test tube until the latter was saturated. The liquid propane-catalyst mixture was then poured into the vinyl ether-propane solution which was maintained at −60° C. during the mixing operation. The temperature of the reaction mixture was then permitted to increase to the boiling point of liquid propane (−42° C.) when the propane was allowed to evaporate. A white, rubbery polymeric material was obtained when the liquid propane had completely evaporated.

It is apparent that in following the procedure illustrated in Example III, the boiling point of the specific solvent used will determine to a considerable extent the temperature of the reaction mixture. This temperature may be varied somewhat by changing the prevailing pressure and hence the boiling point of the solvent.

While we have described above the principles of our invention in connection with specific products and method steps, it is to be clearly understood that this description is made only by way of example and not as a limitation to the scope of our invention as set forth in the objects thereof and in the accompanying claims.

We claim:

1. 1-fluoro-2,2-dichlorovinyl methyl ether.
2. A rubber-like polymer of 1-fluoro-2,2-dichlorovinyl methyl ether.
3. A method of preparing 1-fluoro-2,2-dichlorovinyl methyl ether comprising the steps of reacting together molten alkali with 1,1-difluoro-2,2-dichloroethyl methyl ether.
4. A method according to claim 3 in which the temperature of reaction is maintained above 200° C.
5. A method according to claim 3 in which said molten alkali comprises a mixture in equal proportions by weight of potassium hydroxide and sodium hydroxide.
6. A method according to claim 5 in which the temperature of reaction is maintained between 217° C. and 262° C.
7. A method of preparing the rubber-like polymer of 1-fluoro-2,2-dichlorovinyl methyl ether comprising the treatment of 1-fluoro-2,2-dichlorovinyl methyl ether with boron trifluoride in the presence of a solvent.
8. A method according to claim 7 in which said solvent is liquid propane.

References Cited in the file of this patent

McBee et al.: Ind. & Eng. Chem. vol. 39, No. 3, 1947, pp. 412 to 415. (Copy in Sci. Library.)

Miller et al.: Journ. Amer. Chem. Soc., vol. 70, 1948, pp. 431 and 432. (Copy in Sci. Library.)